(12) United States Patent
Bailey

(10) Patent No.: US 7,389,308 B2
(45) Date of Patent: Jun. 17, 2008

(54) SHADOW PAGING

(75) Inventor: Steven J. Bailey, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 510 days.

(21) Appl. No.: 10/448,585

(22) Filed: May 30, 2003

(65) Prior Publication Data

US 2004/0243535 A1 Dec. 2, 2004

(51) Int. Cl.
G06F 17/30 (2006.01)

(52) U.S. Cl. .................. 707/200; 707/202; 707/203; 707/205

(58) Field of Classification Search .......... 707/202, 707/204, 200, 203, 205; 711/209; 714/5, 714/16
See application file for complete search history.

(56) References Cited

U.S. PATENT DOCUMENTS 5,724,581 A 3/1998 Kozakura .............. 395/618

OTHER PUBLICATIONS

Tatu Ylonen, "Shadow Paging Is Feasible", 1995, pp. 1-16.*
Song et al., "No-Log Recovery Mechanism Using Stable Memory For Real-Time Main Memory Database Systems", 1999, pp. 428-431.*
Graefe et al., "Data Compression and Database Performance", 1991, pp. 1-10.*
Kent et al., "Optimizing Shadow Recovery Algorithms", 1988, pp. 155-157.*
Tatu Ylonen, "Shadow Paging Is Feasible", M.S. thesis, Helsinki University of Technology, Department of Computer Science, 1995, pp. 1-20, http://citeseer.ifi.unizh.ch/cache/papers/cs/2169/http:zSzzSzwww.cs.hut.fizSz~ylozSztechreportszSztkk-tko-tr-B123-1995.pdf/shadow-paging-is-feasible.pdf.*
Ylonen, Tatu; "Shadow Paging is Feasible,"; 1994, Department of Computer Science, Helsinki University of Technology, pp. 1-16.*
Donsex, D. et al., "Recoverable Persistent Memory for SmartCard" *Smart Card Research and Applications Third Intl Conference(lecture Notes in Computer Science)*, 2000, 1820, 134-140.
Kim, Y.K. et al., "Recovery in a Shared Disk Parallel Database System Using DFeRAM", *Proc. High Performance Computing . . .*, 1997, 627-632.
Gray, J. et al., "Transaction Processing: Concepts and Techniques", *Passage, Transaction Processing: Concepts and Techniques*, 1994, 728-732, XP-002231205.

(Continued)

*Primary Examiner*—Jeffrey Gaffin
*Assistant Examiner*—Farhan Syed
(74) *Attorney, Agent, or Firm*—Woodcock Washburn LLP

(57) ABSTRACT

Shadow paging is a technique used to achieve atomic and durable transactions, and provides the ability to manipulate pages in a database. During a transaction, the pages affected by the transaction are copied from the database file into a workspace, such as volatile memory, and modified in that workspace. When a transaction is committed, all of the pages that were modified by the transaction are written from the workspace to unused pages in the database file. During execution of the transaction, the state of the database exposed to the user is that in which the database existed prior to the transaction, since the database file still contains the original versions of the modified pages, as they existed before being copied into the workspace. If a user accesses the database before the transaction is complete, or upon recovery of a failure, it will appear as though the transaction has not occurred.

16 Claims, 15 Drawing Sheets

OTHER PUBLICATIONS

Kent, J. et al., "Optimizing Shadow Recovery Algorithms", *IEEE transactions on Software Engineering*, Feb. 1988, 14(2), 155-168, XP-000743793.

Lorie, R.A., "Physical Integrity in a Large Segmented Database", *ACM Transactions on Database Systems*, Mar. 1977, 2(1), 91-104.

* cited by examiner

SHADOW PAGING

FIELD OF THE INVENTION

The present invention relates generally to utilization of memory, and more specifically relates to committing transactions in a database.

BACKGROUND OF THE INVENTION

Databases and database products are in common use today. Increasing in demand are mobile database products. Mobile database products are popular for their small size and portability. However, mobile database products have limited memory. Desirable features of database products include the ability to perform atomic and durable transactions. An atomic transaction is a transaction that is never partially committed—it is performed either fully or not at all. A durable transaction is one in which the change in the state of the database is permanent. Another desirable feature of a database is the ability to recover from failures, such as power failures, disk crashes, and the like. Current systems that perform atomic and durable transactions, and to provide stabile database recovery tend to be complex and require large amount of memory. Complex, memory intensive processes are not suited for products having limited amounts of memory, such as mobile database products.

A technique for performing atomic and durable transactions and providing a means to reliably recover from unexpected failures in a device having a limited amount of memory is desired.

SUMMARY OF THE INVENTION

The present invention provides a technique for accessing a database, while mitigating the detrimental effects of unexpected failures. This technique uses relatively little software code, thus making it especially suitable for electronic devices having limited amounts of memory or limited speed, such as hand held devices, and/or mobile database products (e.g., SQL-CE). The present invention uses shadow paging to provide an efficient means for maintaining the current state of a database until an atomic transaction is complete, so that the transaction can be rolled back in the event that a system failure occurs while the transaction is committing. Once the transaction is complete, the new state of the database is available for use.

During a transaction, the pages affected by the transaction are copied from the database file into a workspace, such as volatile memory, and modified in that workspace. When a transaction is committed, all of the pages that were modified by the transaction are written from the workspace to unused pages in the database file. During execution of the transaction, the state of the database exposed to the user is that in which the database existed prior to the transaction, since the database file still contains the original versions of the modified pages, as they existed before being copied into the workspace. Thus, if a user accesses the database before the transaction is complete, it will appear to the user as though the transaction has not occurred. Further, if a failure occurs during the execution of the transaction, upon recovery, the system is in the state previous to the commencement of the transaction. For example, if a failure (e.g., disk failure, power loss, machine crash) occurs midway through writing pages to the database, the database is still in a consistent state.

In an exemplary method for performing shadow paging, the contents of selected pages of the database file are stored in unused pages of the database file (referred to as first shadow pages). The first shadow pages are declared as used pages. Maintenance pages (database header page, directory page, mapping table pages) for maintaining locations of pages in a database file are updated to reflect locations of the first shadow pages in the database file and the locations of the selected pages are maintained. The contents of a portion (directory page, mapping table pages) of the maintenance pages are stored in unused pages (referred to as second shadow pages) of the database file. The second shadow pages are declared as used pages. The contents of the first shadow pages and the second shadow pages are then stored in a persistent memory. The contents of another portion (database header page) of the maintenance pages are stored in the persistent memory, and the contents of the first shadow pages and the second shadow pages are stored in the persistent memory again.

A system for implementing this method includes the database file, the persistent memory, a controller, and a page allocation indicator. The controller generates the maintenances pages for maintaining locations of pages in the database file and stores contents of the selected pages of the database file in the first shadow pages. The controller updates the maintenance pages to reflect locations of the first shadow pages while maintaining the locations of the selected pages and stores contents of the first portion of the maintenance pages in the second shadow pages. The controller also stores contents of the first shadow pages and the second shadow pages in the persistent memory, stores contents of the second portion of the maintenance pages in the persistent memory, and stores the contents of the first shadow pages and the second shadow pages in the persistent memory again. The page allocation indicator indicates that the first shadow pages are used pages in response to the selected pages being stored in the first shadow pages and indicates that the second shadow pages are used pages in response to the contents of the first portion being stored in the second shadow pages.

BRIEF DESCRIPTION OF THE DRAWINGS

The features and advantages of the present invention will be best understood when considering the following description in conjunction with the accompanying drawings, of which.

DETAILED DESCRIPTION OF ILLUSTRATIVE EMBODIMENTS

Shadow paging as described herein provides a technique for accessing and controlling memory, such as in a database, while mitigating the detrimental effects of unexpected faults, such as power failures, disk crashes, and/or processor failures. This technique is relatively easy to implement and utilizes very little software code, thus making it especially suitable for electronic devices having limited amounts of memory, such as hand held devices, and/or mobile database products (e.g., SQL-CE). Important features of database products include the ability to perform atomic and durable transactions. An atomic transaction is a transaction that is never partially committed—i.e., it is performed either fully or not at all. A durable transaction is one in which the change in the state of the database is permanent, in the sense that the resulting post-transaction state of the database will survive even if the system crashes immediately after the transaction is performed. Shadow paging provides a mechanism for performing atomic and durable transactions.

Figure 1:
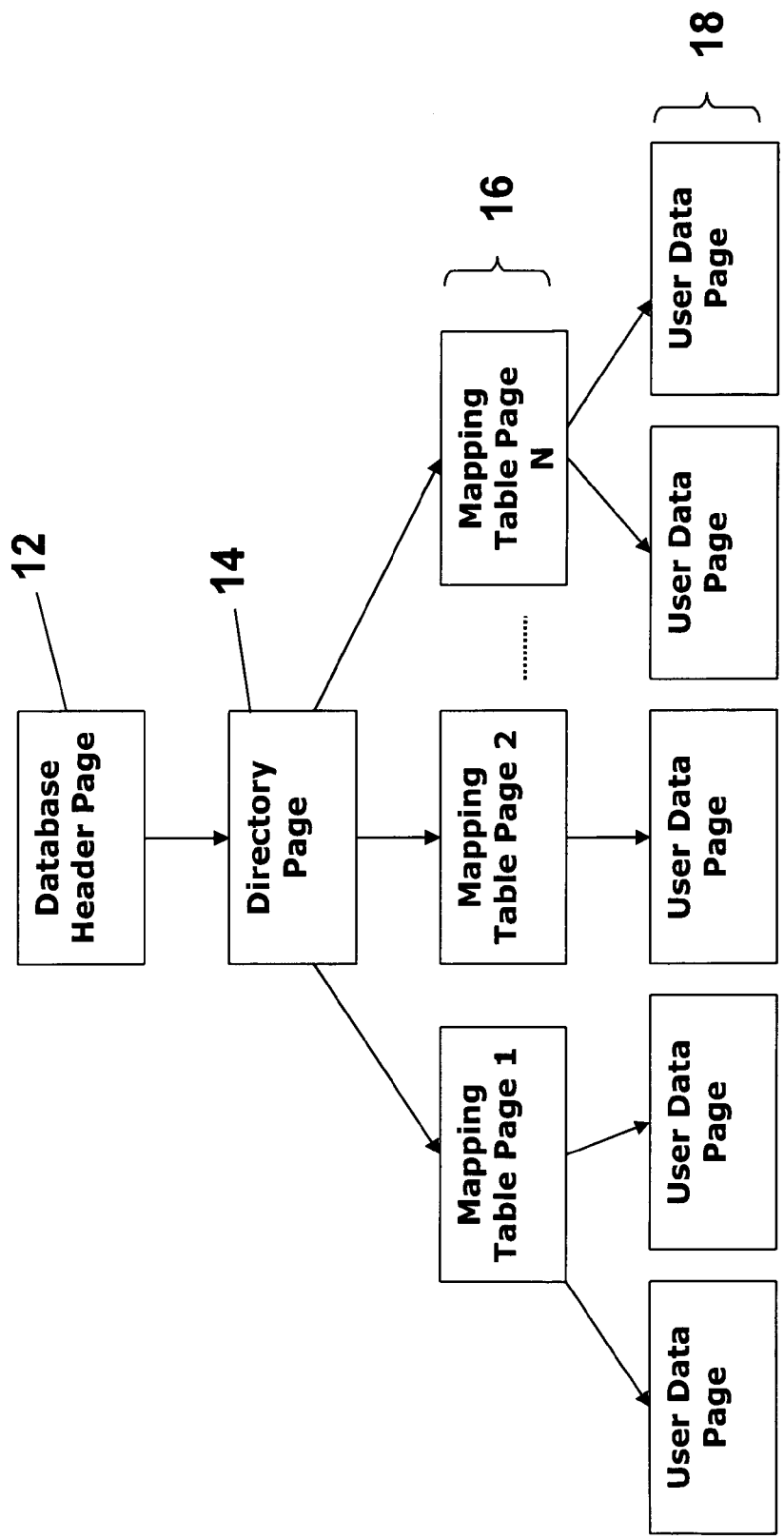
FIG. 1 is an illustration of a memory page structure utilized to perform shadow paging, in accordance with an exemplary embodiment of the present invention.

FIG. 1 is an illustration of an exemplary database organization in which shadow paging may be performed. In an exemplary embodiment, shadow paging may be utilized when a database with the structure shown in FIG. 1 is modified, and the invention is described herein in the context of such a database. However, it is to be understood that shadow paging as described herein is not limited to database applications, but may be utilized in various other scenarios involving memory utilization.

The pages depicted in FIG. 1 are pages of a database file, which include a database header page 12, a directory page 14, at least one mapping table page 16, and at least one user data page 18. The pages of the database file depicted in FIG. 1 comprise pages of memory or storage. Such memory or storage is not to be limited to a particular type or class of memory, but may include semiconductor memory, magnetic memory (e.g., disk), optical memory, mechanical memory, random access memory (RAM), volatile memory, and nonvolatile memory, or any other type of device that is capable of storing data. In the following description, the term "page of memory" is not limited to traditional "memory" devices (such as RAM or ROM), but shall be understood to include all types of data storage devices.

The page structure shown in FIG. 1 is capable of being implemented utilizing a relatively small amount of memory. For example, if the size of a page is 4096 bytes and the maximum database file size is $2^{32}$ bytes (4 gigabytes), the resulting maximum number of pages in the file is $2^{20}$ pages. Accordingly, the mapping table pages 16 stores a maximum of $2^{20}$ entries (one entry for each page). If the physical position of a page in the file is identified using a byte offset, then 32 bits are used to represent each page. This can be reduced to 20 bits per-page by storing the offset of the page as an increment of the page size. Accordingly, the mapping table pages 16 use $(2^{20})\times20$ bits of space, resulting in 2,621,440 bytes. In an exemplary embodiment, the mapping table 16 are stored in the database file as a set of pages. If a mapping table page is 4096 bytes and 20 bits are used to store the physical location of a page, a maximum of 1638 pages per mapping table page can be referenced. Thus a maximum of 641 mapping table pages can be utilized to reference the maximum of $2^{20}$ pages. Typical databases files are much smaller than 4 gigabytes, and thus would utilize less mapping table pages. As described above, the directory page 14 is utilized to track the physical location of the mapping table pages 16 in the database file (e.g., as the mapping table pages 16 are modified and flushed to new locations). In accordance with the above example, the directory page 14 has a 20 bit entry that tracks the physical location of each mapping table page 16 in the database file. The header page 12, directory page 14, and mapping table pages 16 consume a relatively small amount of disk space (memory) in comparison to the number of user data pages 18. For example, 1,047,933 ($2^{20}$ minus 643) user data pages 18 can be maintained by 643 "maintenance pages." (As used herein, a "maintenance page" is a page that stores administrative data used by the database system, rather than user data. In the example of FIG. 1, header page 12, directory page 14, and mapping table pages 16 are "maintenance pages.") This results in the maintenance pages consuming only 0.06% of the total database file space. It should be noted that the values described above of a 4096 byte page and a 20 bit data type are exemplary. It is envisioned that implementations of this above described file structure can utilize data compression to reduce the 20 bit data type to a smaller size data type.

The maintenance pages maintain the locations of all the pages depicted in FIG. 1. The database header page 12 maintains the location of directory page 14. In an exemplary embodiment, the physical address of the directory page 14 is stored in the first sector of the database header page 12 and the database header page 12 is stored at the start of the database file. As described below, this will ensure that transactions are atomic. The directory page 14 maintains the locations of mapping table pages 16. The mapping table pages 16 maintain the locations of user data pages 18. The user data pages 18 are pages that may contain database data, such as records and/or index keys, for example. As described in greater detail below, the memory page structure shown in FIG. 1 is used to track and maintain pages of memory during shadow paging.

The structure shown in FIG. 1 allows pages to be identified by "logical" identifiers. Typical database products utilize page identifiers that represent the physical addresses of the pages within a file. For example, typical database products may identify a given page by an offset value referenced from the logical beginning of the database file. Since pages may reference other pages, these identifiers may often appear in various places throughout the database. This approach of identifying pages thus makes it difficult to move pages from one location of the file to another, since all of the page identifiers that reference the moved pages must be updated to reflect the new locations (e.g., new page offset value) whenever one or more pages are moved. However, when the structure of FIG. 1 is used, a given page can be identified based on the elements within the directory page and mapping table pages that point to the given page. For example, a given page can be identified by an offset into the directory page, and an offset into a mapping table page; the given page is then located by: (1) following the pointer found at the specified offset in the directory page to locate a particular mapping table page, and (2) following the pointer found in the located mapping table page in order to find the given page. Thus, a page can be moved to a different location in the database file without changing its logical identifier, by simply updating the appropriate entries in the directory page and mapping tables. This technique is analogous to the use of address translation tables in a virtual memory system.

Figure 2:
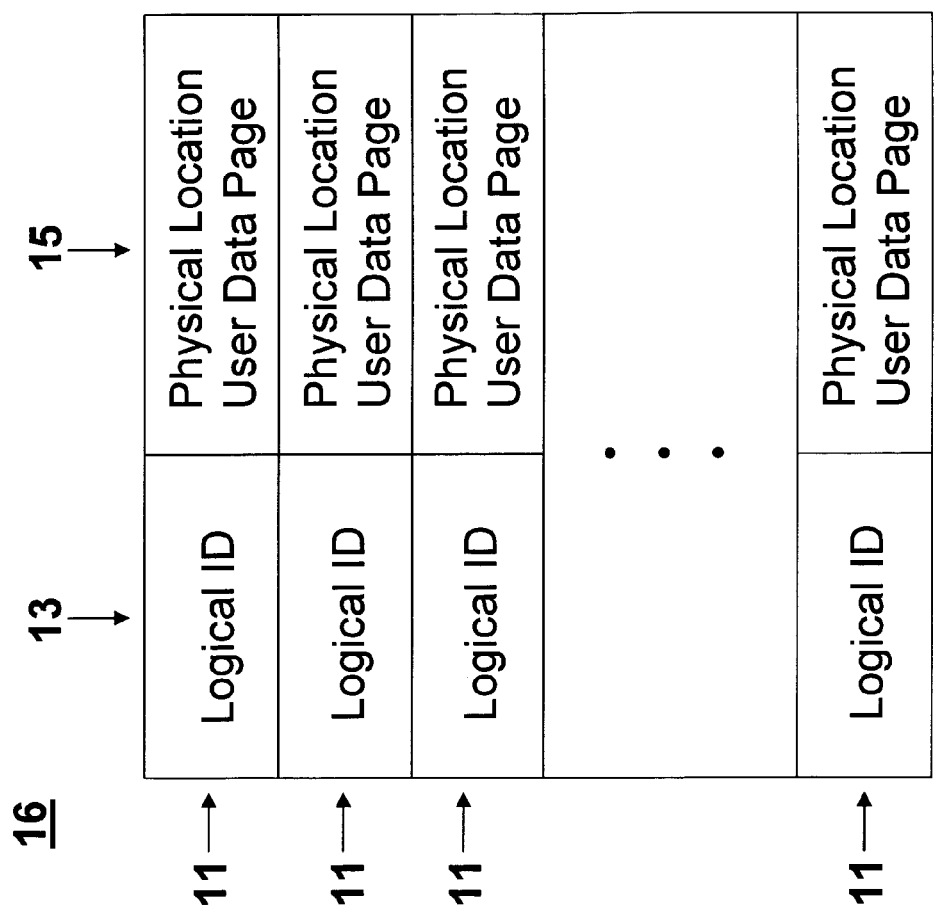
FIG. 2 is an illustration of a portion of a mapping table page showing logical IDs mapped to physical locations of user data pages, in accordance with an exemplary embodiment of the present invention.

As discussed more particularly below, the use of logical page identifiers facilitates the implementation of shadow paging, and thus, in an exemplary embodiment of the present invention, pages in a database file are identified by logical page identifiers (IDs). Within the database, pages are accessed and tracked via logical IDs. The locations of pages also are maintained through the use of the logical page IDs. FIG. 2 is an illustration of a portion of a mapping table page 16 showing logical IDs 13 mapped to physical locations 15 of user data pages 18. (It will be understood that the "physical" location of a page in the database file refers to the fact that each page of the database file (or any file) is defined by the underlying file system as having some offset from the beginning of the file, and this offset does not change—even if the file system rearranges the actual location of the pages on disk. However, the term "physical" location does not imply that the database management system is necessarily aware of where on disk the given page is stored.) A logical page ID 13 is mapped to a physical page address of a user data page 18. This mapping is accomplished via the mapping tables 16. The mapping tables 16 are stored in the data base file as a set of pages. Each mapping table 16 comprises entries 11 that map a logical page ID 13 to a physical page address 15 (also referred to as a location) of a respective user data page 18. When a physical location of a user data page 18 is changed (e.g., when data is flushed to a database), its corresponding entry in the mapping table 16 is updated. For that entry, the logical ID 13 of the user data page 18 being moved does not change, but the physical address to which the user data page 18 is being moved is entered into the physical location portion 15 of the entry 11 in the mapping table 16.

The database header page 12 and the directory page 14 also contain entries that map logical IDs to physical addresses. The database header page 12 contains an entry that maps a logical ID to the physical address of the directory page 14. The directory page 14 contains entries that map logical IDs to physical addresses of the mapping tables 16.

Figure 3:
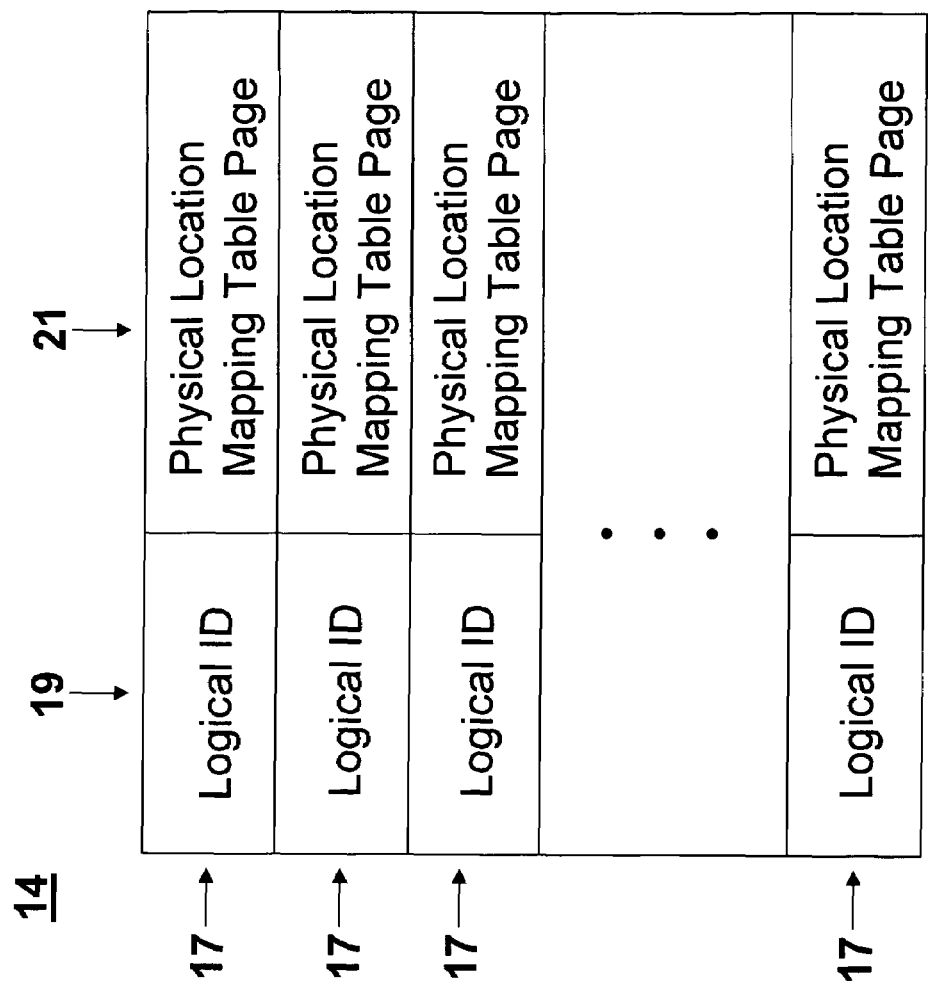
FIG. 3 is an illustration of a portion of a directory page showing logical IDs mapped to physical locations of mapping table pages, in accordance with an exemplary embodiment of the present invention.

FIG. 3 is an illustration of a portion of a directory page 14 showing logical IDs 19 mapped to physical locations 21 of mapping table pages 16. Each directory page 14 comprises entries 17 that map a logical page ID 19 to a physical page address 21 of a respective mapping table page 16. When a physical location of a mapping table page 16 is changed (e.g., when data is flushed to a database), its corresponding entry in the directory table 14 is updated. For that entry, the logical ID 19 of the mapping table page 16 being moved does not change, but the physical address to which the mapping table page 16 is being moved is entered into the physical location portion 21 of the entry 17 in the directory page 14.

Figure 4:
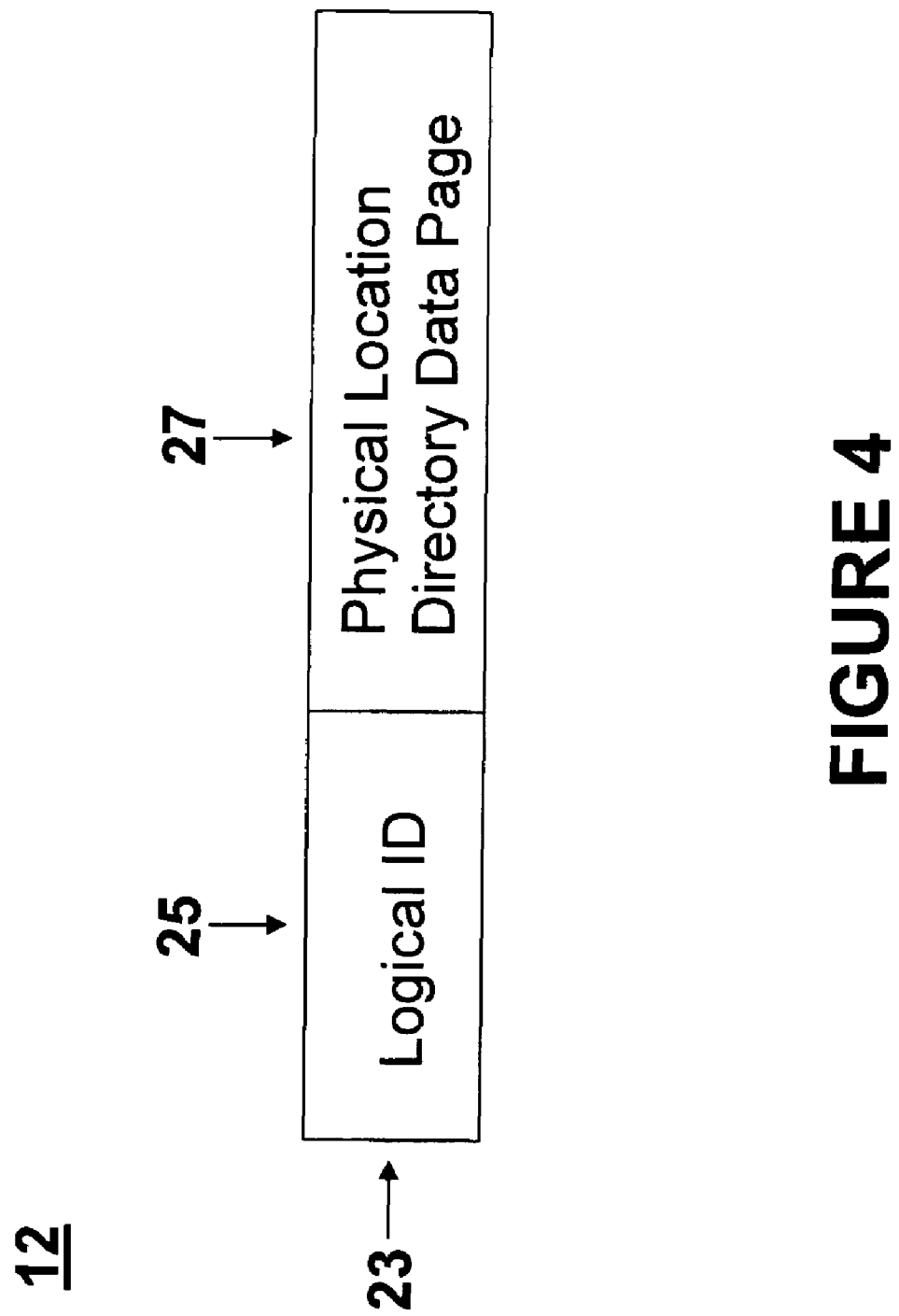
FIG. 4 is an illustration of a portion of a database header page showing a logical ID mapped to the physical location of the directory pages, in accordance with an exemplary embodiment of the present invention.

FIG. 4 is an illustration of a portion of a database header page 12 showing a logical ID 25 mapped to the physical location 27 of the directory pages 14. The database header page 12 comprises an entry 23 that maps a logical page ID 25 to a physical address 27 of the directory page 14. When the physical location of the directory page 14 is changed (e.g., when data is flushed to a database), its corresponding entry in the database header page 12 is updated. For that entry, the logical ID 25 of the database header page 12 being moved does not change, but the physical address to which the directory page 14 is being moved is entered into the physical location portion 27 of the entry 23 in the database header page 12.

In an exemplary embodiment, logical ID are assigned such that the type of page to which the logical ID refers (i.e., header, directory, mapping table, or user data page) can be deduced from the logical ID references. For example, utilizing the above described page and entry sizes, a page ID of 0 may refer to the database header page 12, a page ID of 1 may refer to the directory page 14, a page ID of 2, up to and including 643 may refer to a mapping table pages 16, and a page ID greater than or equal to 644 may refer to a user data page 18. A logical ID may be represented in any appropriate manner. In one exemplary embodiment, a logical ID is represented as a 20 bit unsigned value. The least significant 10 bits correspond to an entry in the directory page 14 which contains the physical page address of the corresponding mapping table page 16. The most significant 10 bits correspond to an entry in the appropriate mapping table page 16 which contains the physical page address of the corresponding user data page 18.

Logical IDs may be mapped to physical addresses in any appropriate manner. An exemplary technique for mapping logical IDs to physical addresses is shown below in Table 1 in the form of pseudo code. The technique shown in Table 1 uses the above described logical ID to physical addresses assignments.

TABLE 1

```
DWORD TranslateLogicalPageId(PAGEID idPage)
{
  // local variables
  //
  DWORD                  iEntry;
  20bitValue             ofDirectoryPage;
  20bitValue             ofMapPage;
  20bitValue             ofDataPage;
  DATABASEHEADERPAGE     headerPage;
  DIRECTORYPAGE          directoryPage;
  MAPPINGTABLEPAGE       mapPage;
  // if the page id refers to the database header page
  //
  if (0 == idPage)
  {
    // return zero (db header page is always at offset zero)
    //
    return 0;
  }
  // read the database header page
  //
  ReadPage(0, &headerPage);
  // save the physical address of the directory page
  //
  ofDirectoryPage = headerPage.DirectoryPageAddress;
  // if the logical page id refers to the directory page?
  //
  if (1 == idPage)
  {
    // return the physical address of the directory page
    //
    return ofDirectoryPage;
  }
  // read the directory page from the database
  //
  ReadPage(ofDirectoryPage * PAGESIZE, &directoryPage);
  // the least significant 10 bits are an index into the directory page
  //
  iEntry = GetLeastSignificant10Bits(idPage);
  // get the physical address of the corresponding mapping table page
  //
  ofMapPage = directoryPage.rgMappingTablePageAddress[iEntry];
  // if the logical page id refers to this mapping table page?
  //
  if (idPage <= 643)
  {
    // return the physical address of the mapping table page
    //
    return ofMapPage;
  }
  // read the mapping table page from the database
  //
  ReadPage(ofMapPage * PAGESIZE, &mapPage);
  // the most significant 10 bits are an index into the mapping page
```

TABLE 1-continued

```
//
iEntry = GetMostSignifican10Bits(idPage);
// get the physical address of the corresponding data page
//
ofDataPage = mapPage.rgUserDataPageAddress[iEntry];
// return the physical address of the user data page (idPage)
//
return ofDataPage;
}
```

As described in more detail below, shadow paging in accordance with an embodiment of the present invention involves writing contents of pages to available pages. During this process, some pages will become free and others will become used. To accomplish this, an allocation indicator is provided. An allocation indicator indicates the status (available or unavailable) of logical IDs and physical addresses. Any appropriate means for indicating status may be utilized. In an exemplary embodiment, a bitmap is used to indicate the allocation status of the logical IDs. The logical ID allocation bitmap contains a bit for each entry in a maintenance page (mapping table pages 16, directory page 14, and database header page 12). In an exemplary embodiment, a bit set to 1, indicates that the corresponding entry is allocated (not available). A bit is set to 0, indicates that the corresponding entry is free (available). During the shadow paging process, an available page may be located by searching for a bitmap value of zero. To indicate that the found page is now allocated (unavailable), the corresponding bitmap entry is changed to 1.

In an exemplary embodiment, the logical ID allocation bitmap is stored in the database file as a set of pages. In another embodiment, the bitmap is not stored in the database file, and is initialized when the database is opened. Initialization can be accomplished by enumerating all of the page entries in the mapping table (e.g. reading each entry in the database header page 12, the directory page 14, and the mapping table pages 16). If a page entry contains a valid physical address of a page, then the page ID corresponding to that page entry is marked as allocated. Once all entries are scanned, the bitmap now indicates the current allocation status of the page IDs.

This allocation bitmap can be stored in the database file. For example, if the maximum database file size is $2^{32}$ bytes (4 gigabytes), and the database page size is 4096 bytes, this results in a maximum of $2^{20}$ logical page IDs. The logical page ID allocation bitmap can thus be implemented using 131,072 bytes.

Utilizing an allocation bitmap allows logical page IDs to be freed and/or allocated without modifying or reading the maintenance pages. This improves concurrency by allowing multiple transactions to allocate and free page IDs in a database at the same time. Utilizing an allocation bitmap also provides a robust mechanism for allocating and freeing logical page IDs, because the bitmap and the page entries are all contained within the database file. This mechanism is robust in that after a transaction has been flushed to disk, free physical page addresses are marked as free and allocated physical page addresses are marked as allocated. If this were not the case, if an operation failed, one would have to rollback the entire flush, which would be very difficult because the database header page with the new physical address of the updated directory page (and mapping table pages, etc) have already been flushed.

Once the bitmap has been read into memory, or computed by scanning the page entries, allocating and freeing pages can be accomplished by counting the number of bits in the bitmap until the bit that corresponds to the page to be allocated/freed is encountered. For example, using the page sizes and database structure described in the above example, a page ID corresponding to use data pages can be allocated by finding the first bit greater than or equal to bit 644 in the bitmap that is set to zero. The number 644 is chosen because all of the page IDs below 644 are reserved for maintenance pages in the above example. To free a logical page ID the bit is simply changed from 1 to 0.

The same bitmap-type mechanism described above for allocating and freeing logical page IDs is also applicable for allocating and freeing physical page addresses. In this case, the bitmap has one bit for each physical page address in the database file. In an exemplary embodiment, a bit set to 1 indicates that the physical page address is allocated. A bit set to 0 indicates that the physical page address is free.

A physical page address is the location of a page within a database. Physical page addresses are allocated when a transaction commits and pages are shadowed on disk, and when replacing a dirty page in a shadow pool. A dirty page is a page that has been modified. Shadow paging as described herein provides the ability to efficiently find a physical page address of an empty/unused page. In an exemplary embodiment, this physical address allocation bitmap is stored in the database file. As described above, this physical address allocation bitmap can be implemented within a maximum size of 131,072 bytes. In yet another embodiment, the physical address allocation bitmap is computed when the database is opened by scanning the database header page 12, directory page 14, and the mapping table pages 16. If the bitmap is computed, it can be computed at the same time that the logical page ID bitmap is being computed because the same set of pages are scanned.

The technique for freeing a physical page address is the same as freeing a logical page ID as described above. The technique for allocating a physical page address is almost the same as allocating a logical page ID. The difference is that if no existing physical page is free, then the database file is grown (i.e., some number of physical pages is added to the end of the file) and the new physical page addresses appended to the database file are marked as free physical page addresses in the address bitmap.

An exemplary technique for initializing the logical page ID bitmap and the physical page address bitmap when opening a database for the first time is shown below in Table 2 in the form of pseudo code.

TABLE 2

```
// this class is used to maintain a set of bit values
//
class Bitmap
{
    // set the value of the bit at position iBit to 1 or 0
    //
    void SetBit(DWORD iBit, bool fValue);
    // get the value of the bit at position iBit
    //
    bool GetBit(DWORD iBit);
};
// some useful constants
//
const ULONG PAGEID_HEADER    = 0;
const ULONG PAGEID_DIRECTORY = 1;
DWORD ComputeBitmaps(
    Bitmap& idBitmap,       // free / allocated page id bitmap
    Bitmap& addressBitmap)  // free / allocated page address bitmap
{
    // local variables
    //
```

TABLE 2-continued

```
ULONG                    idPage;
20bitValue               ofMapPage;
20bitValue               ofDataPage;
DATABASEHEADERPAGE       headerPage;
DIRECTORYPAGE            directoryPage;
MAPPINGTABLEPAGE         mapPage;
// mark the header page id and address as allocated
//
idBitmap.SetBit(PAGEID_HEADER, 1);
addressBitmap.SetBit(0, 1);
// read the database header page from offset zero
//
ReadPage(0, &headerPage);
// mark the directory page id and address as allocated
//
idBitmap.SetBit(PAGEID_DIRECTORY, 1);
addressBitmap.SetBit(headerPage.DirectoryPageAddress, 1);
// read the directory page from the database
//
ReadPage(headerPage.DirectoryPageAddress * PAGESIZE,
&directoryPage);
// enumerate through the mapping table pages referenced
//
for (ULONG i = 0; i < 641; i++)
{
   // get the address of the map page
   //
   ofMapPage = directoryPage.rgMappingTablePageAddress[i];
   // if there is no mapping table page referenced here?
   //
   if (0 == ofMapPage)
   {
      // go to the next mapping table page
      //
      continue;
   }
   // make a page id
   //
   idPage = MakePageId(i /* high 10 bits */, j /* low 10 bits */);
   // mark the mapping table page id and address as allocated
   //
   idBitmap.SetBit(idPage, 1);
   addressBitmap.SetBit(ofMapPage, 1);
   // read the mapping table page from the database
   //
   ReadPage(ofMapPage * PAGESIZE, &mapPage);
   // enumerate through the user data pages referenced
   //
   for (ULONG j = 0; j < 1638; j++)
   {
      // get the physical address of the corresponding data page
      //
      ofDataPage = mapPage.rgUserDataPageAddress[j];
      // if there is no user data page referenced here?
      //
      if (0 == ofDataPage)
      {
         // go to the next user data page in this mapping table
page
         //
         continue;
      }
      // make a page id
      //
      idPage = MakePageId(i /* high 10 bits */, j /* low 10 bits
*/);
      // mark the user data page id and address as allocated
      //
      idBitmap.SetBit(idPage, 1);
      addressBitmap.SetBit(ofDataPage, 1);
   }
}
// at this point the page id bitmap and address bitmap represent the
// current set of allocated / free logical page ids, and the current
// set of allocated / free physical page addresses.
}
```

Figure 5:
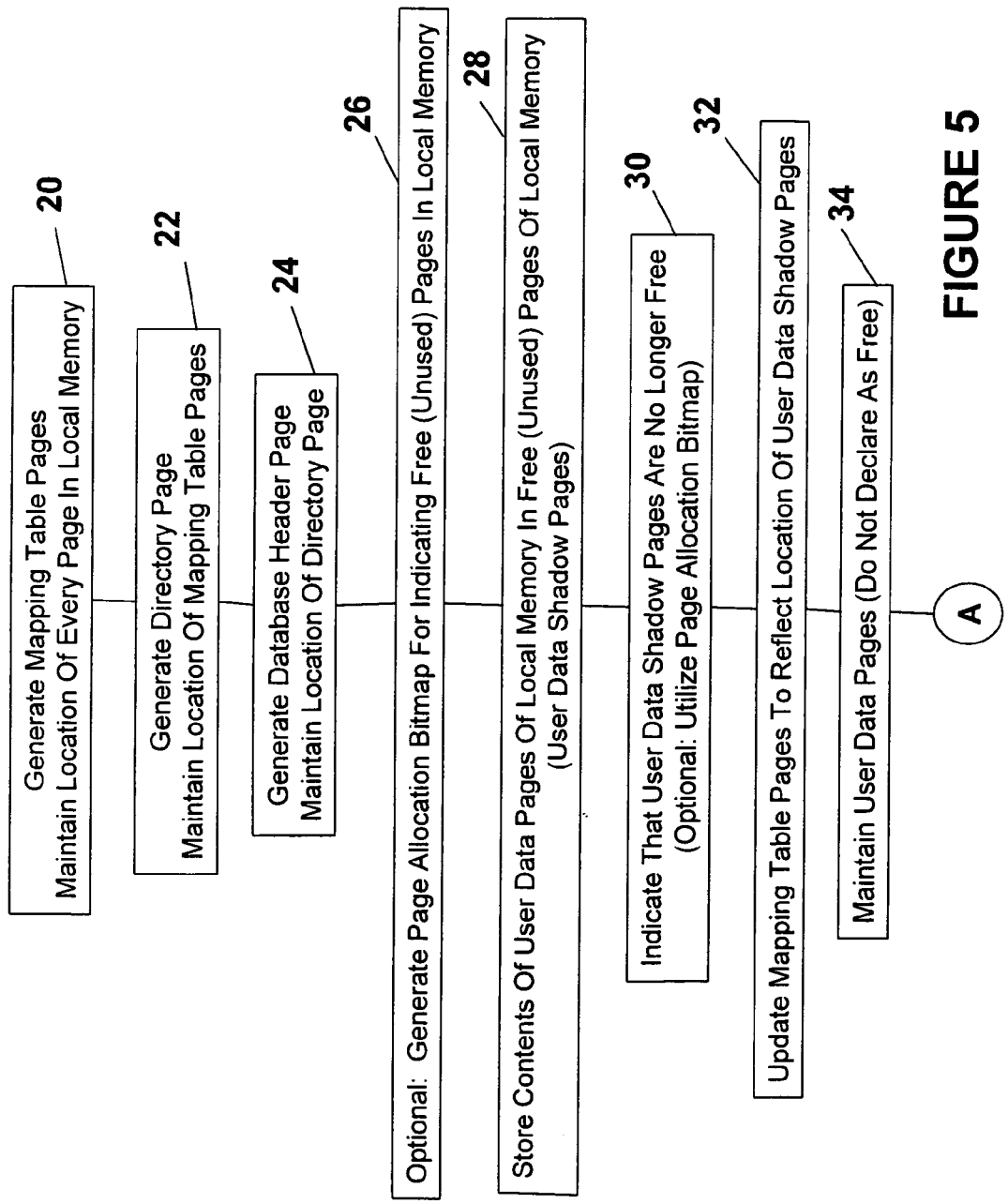
FIGS. 5 through 7 are a flow diagram of a process for performing shadowing paging, in accordance with an exemplary embodiment of the present invention.
Figure 6:
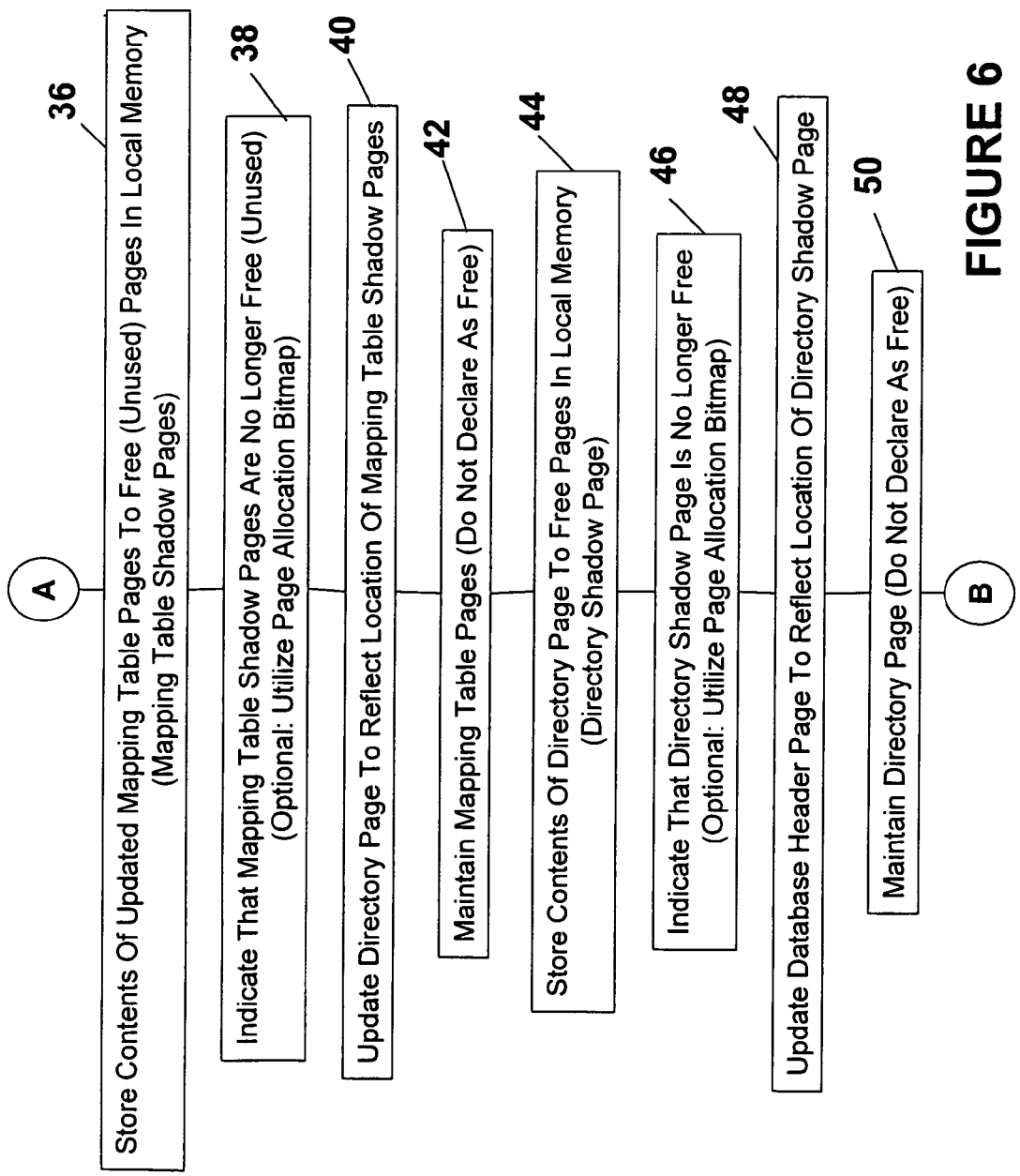
Figure 7:
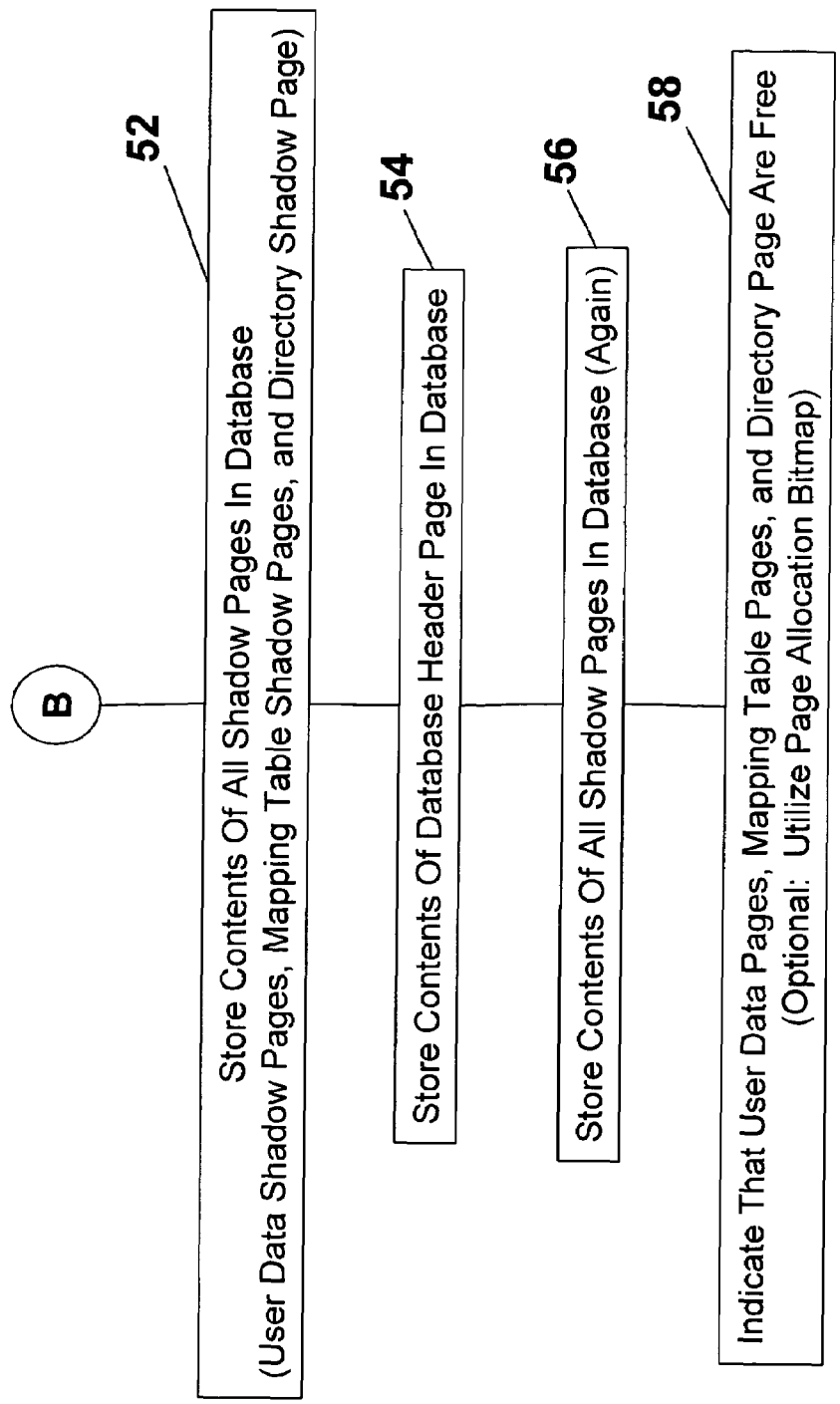

FIGS. 5 through 7 are a flow diagram of an exemplary process for performing shadowing paging. As described above, when a transaction is committed, all of the pages that were modified by the transaction are written to unused (free) pages in the database file (first database memory). During execution of the transaction, the state of memory and access to the database prior to the transaction are maintained. The process depicted in FIGS. 5 through 7 is described below with exemplary reference to components depicted in FIGS. 1 through 4.

Mapping table pages (e.g., mapping table pages 18) are generated in the database file, at step 20. These mapping table pages are utilized to maintain the locations of the user data pages (e.g., user data pages 18) in the database file. Maintenance of the location of user data pages by the mapping table pages is accomplished as described above. The directory page (e.g., directory page 14) is generated in the database file at step 22. The directory page is utilized to maintain the locations of the mapping table pages. Maintenance of the location of mapping table pages by the directory page is accomplished as described above. The database header page (e.g., database header page 12) is generated in the database file at step 24. The database header page is utilized to maintain the location of the directory page. Maintenance of the location of the directory page by the database header page is as described above. Optionally, as described above, a page allocation bitmaps are generated at step 26. Generation of this bitmap may include a bitmap for indicating the allocation of logical IDs, a bitmap for indicating the allocation of physical addresses, or a combination thereof. Typically, the maintenance pages and bitmaps are generated when the database file is initially created, and before any data is placed in the database file.

At step 28, contents of user data pages that are to be modified (dirty pages) in the database file are stored in unused pages in the database file. In one embodiment, modified pages are maintained in volatile memory until the transaction is committed. When a transaction commits, dirty user data pages are written, from volatile memory, to un-used pages in the database file. The unused pages to which the contents of the dirty pages are stored are referred to as shadow pages. Thus, dirty user data pages are written to unused pages (shadow pages) in the workspace. Shadow pages are written into before the original user data pages are marked as free, thus maintaining the original user data pages for a period of time. If this operation fails before completion, the database is still in a consistent state because only unused pages will have been overwritten, and the header, directory, and mapping tables will still reflect only the existence of the old pages, not the shadow pages. In one embodiment, this is accomplished by copying the original user data pages into a workspace. Modifications are made in the workspace, then the modified workspace pages are copied to free pages (shadow pages) before a transaction is committed.

At step 30, the user data shadow pages are marked as being allocated. That is, the pages to which the dirty pages have been written are no longer free. This allocated status is indicated by any appropriate mechanism. One such mechanism is the allocation bitmap. Thus, in an exemplary embodiment, the allocation status of the shadow pages is indicated by an allocation bitmap at step 30. As each user data page is written to a new physical page address (shadowed), the user data page's corresponding entry in the mapping table is updated to reflect the new location of the user data page at step 32. The user data page's previous physical address (the address from which the contents were moved) is maintained as "allocated" at step 34. That is, the previous physical address of the user data pages are not declared as free. Because the user data pages have not been updated yet, the database system is able to recover to its previous state, in the event of a failure. Thus the user data page's old physical addresses are "saved off", and as described below, after the transaction is completed, the old physical page addresses are marked as free (see step 58).

At step 36, the contents of the mapping table pages that were modified (updated) are stored in unused pages in the database file (mapping table shadow pages). Thus, dirty mapping table pages are written to unused pages (shadow pages) in the database file. Shadow pages are written into before any modifications are made, thus maintaining the old pages for a period of time. If this operation fails before completion, the database is still in a consistent state because only unused pages have been overwritten. In one embodiment, this is accomplished by copying the original mapping table pages into a workspace. Modifications are made in the workspace, then the modified workspace pages are copied to free pages (shadow pages) before a transaction is committed. At step 38, the mapping table shadow pages are marked as being allocated. That is, the pages to which the dirty pages have been written are no longer free. This allocated status is indicated by any appropriate mechanism. One such mechanism is the allocation bitmap. Thus, in an exemplary embodiment, the allocation status of the mapping table pages is indicated by an allocation bitmap at step 38. The directory page (e.g., directory page 14) is updated to reflect the locations of the mapping table shadow pages at step 40. Thus, as each mapping table page is written to a new physical page address, the mapping table page's corresponding entry in the directory page is updated to reflect the new location of the mapping table page. The mapping table page's previous physical address (the address from which the contents were moved) is maintained at step 42. That is, the physical address of the previous mapping table pages are not declared as free. This allows the database system to recover to its previous state, in the event of a failure. Thus the mapping table page's old physical addresses are "saved off", and as described below, after the transaction is completed, the old physical page addresses are marked as free (see step 58).

At step 44, the contents of the directory page is stored in an unused page in database file (directory shadow page). Shadow pages are written into before any modifications are made, thus maintaining the old pages for a period of time. In one embodiment, this is accomplished by copying the original directory page into a workspace. Modifications are made in the workspace, then the modified workspace page is copied to a free page (shadow page) before a transaction is committed. At step 46, the directory shadow page is marked as being allocated. That is, the page to which the directory page has been written is no longer free. This allocated status is indicated by any appropriate mechanism. One such mechanism is the allocation bitmap. Thus, in an exemplary embodiment, the allocation status of the directory page is indicated by an allocation bitmap at step 46. The database header page (e.g., database header page 12) is updated to reflect the locations of the directory shadow page at step 48. Thus, as the directory page is written to a new physical page address, the directory page's corresponding entry in the database header page is updated to reflect the new location of the directory page. The directory page's previous physical address (the address from which the contents were moved) is maintained at step 50. That is, the physical address of the previous directory page is not declared as free. This allows the database system to recover to its previous state, in the event of a failure. Thus the directory page's old physical address is "saved off", and as described below, after the transaction is completed, the old physical page address is marked as free (see step 58).

At step 52, the contents of all the shadow pages (user data shadow pages, mapping table shadow pages, directory shadow page) in the database file are stored in the database persistent memory (flushed). The database file shadows are flushed, thus hardening all of the changes from the previous steps onto a persistent storage mechanism (e.g., disk). The database header page is stored in the database (flushed) at step 54. At step 56, the shadow pages are flushed again. This double flush technique ensures that the database system will be in a consistent state, upon recovery, in the case of a failure. Until the database header page is written, no unsafe changes have been made to the database file. Other transaction can be using the old or currently committed versions of the database header page, the directory page, and mapping table pages. When the database header page is committed, this activates the new directory page, which activates the new mapping table pages, which activates the new versions of the user data pages. For example, if the flush occurred only after the database header page was written, it is possible that the database header page could be hardened on disk (saving the new location of the directory page) before the directory page is hardened on disk. This could cause the state of the database system to become inconsistent. Successful completion of steps 52, 54, and 56, essentially ensures that the transaction was completely executed, thus the old physical page addresses are free for use (available). Accordingly, the user data pages, the mapping table pages, and the directory page are declared as free at step 58. This allocation status may be accomplished by any appropriate mechanism, for example the allocation bitmap described above. At step 58, all the old physical page addresses are freed, and thus can be utilized for other operations. However, if a failure occurred prior to the completion of the flush process, all newly allocated physical page addresses would be freed, and the system would be in its previous state.

In an exemplary embodiment, to ensure that transactions are atomic (e.g., a sector is never partially written), the physical page address of the directory page is stored in the first sector of the database header page, which is stored at the start (e.g., in the first sector) of the database file. Thus, committing a transaction is atomic because if the first sector of the database header page is not written, then the transaction is not committed and the database is still consistent since only unused pages have been overwritten.

Figure 8:
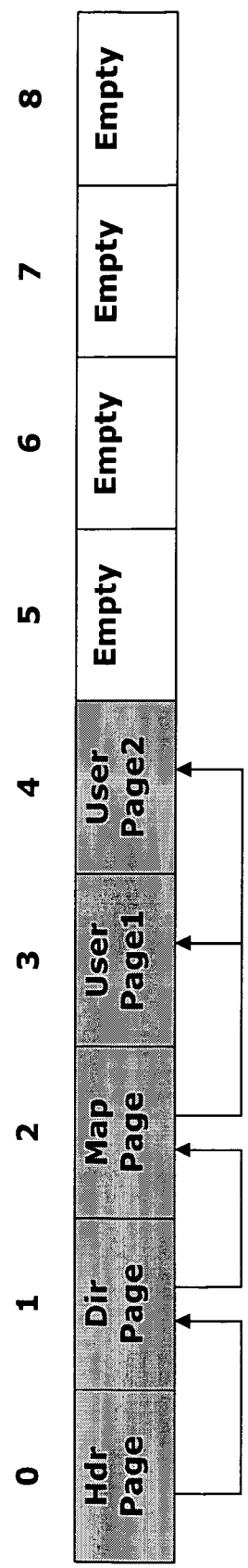
FIGS. 8 through 13 are illustration depicting an example of committing a transaction utilizing shadow paging, in accordance with an exemplary embodiment of the present invention.

An example of performing a transaction utilizing shadow paging is provided below with reference to FIGS. 8 through 13. FIG. 8 illustrates pages 0 through 8 of a database file. Pages 0 is a database header page, page 1 is a directory page, page 2 is a mapping table page, pages 3 and 4 are dirty user data pages, and pages 5 through 8 are empty (unused) pages. The solid lines represent that the entry in the header page (logical ID) points to the directory page, the entry in the directory page point to the mapping table page, and the entries in the mapping table pages point to user data pages. This example commences with the assumption that a transaction has started and has modified user page 1 and user page 2 and is now committing. As described above the dirty copies of user page 1 and user page 2 are written to unused locations in the file.

Figure 9:
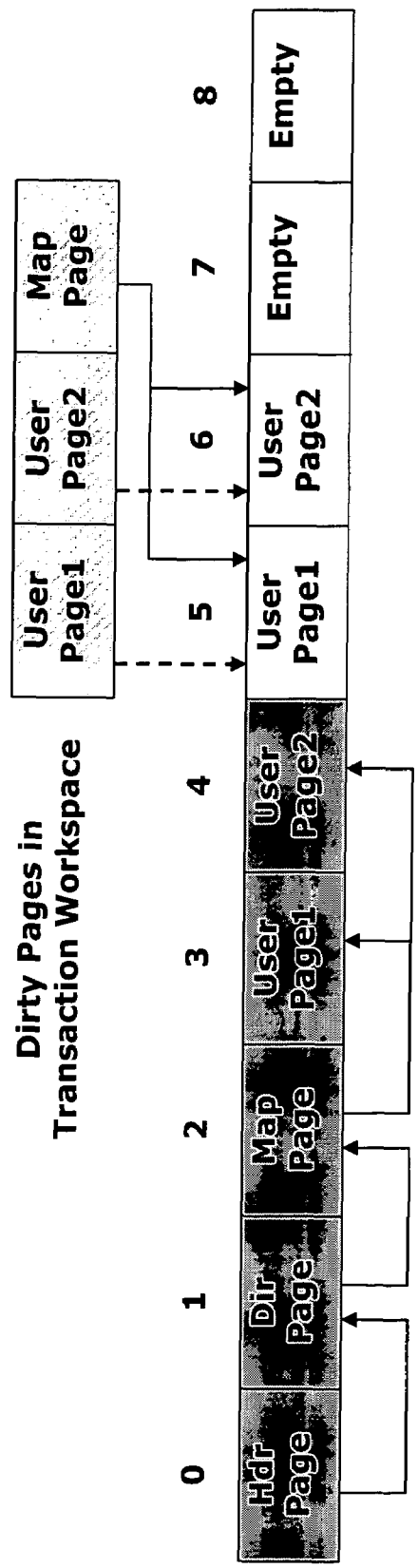

FIG. 9 illustrates the user pages 1 and 2 (i.e., physical pages 3 and 4, respectively) being written to the physical page addresses 5 and 6, respectively. The corresponding mapping table page is modified to represent the new locations of user page 1 and user page 2. User pages 1 and 2 being written to pages 5 and 6 is indicated by the dotted arrows coming from the gray striped user pages. Mapping page 2 being modified to represent the new locations of user pages 1 and 2 is indicated by the solid arrows coming from the gray striped mapping table page. Modifying the mapping table page causes it to become a dirty page in the current transaction. As this transaction is executing, other transactions use the mapping table page stored in page 2 (shaded gray). Next the mapping table pages that were modified are written to unused pages. Note that with respect to FIG. 9 pages are written to disk at each step, whereas in the in the description with respect to FIGS. 5 through 7, pages are flushed to disk after all the maintenance pages are updated. Both techniques are appropriate in accordance with the present invention. Thus, pages may be written to disk at any appropriate point in the process.

Figure 10:
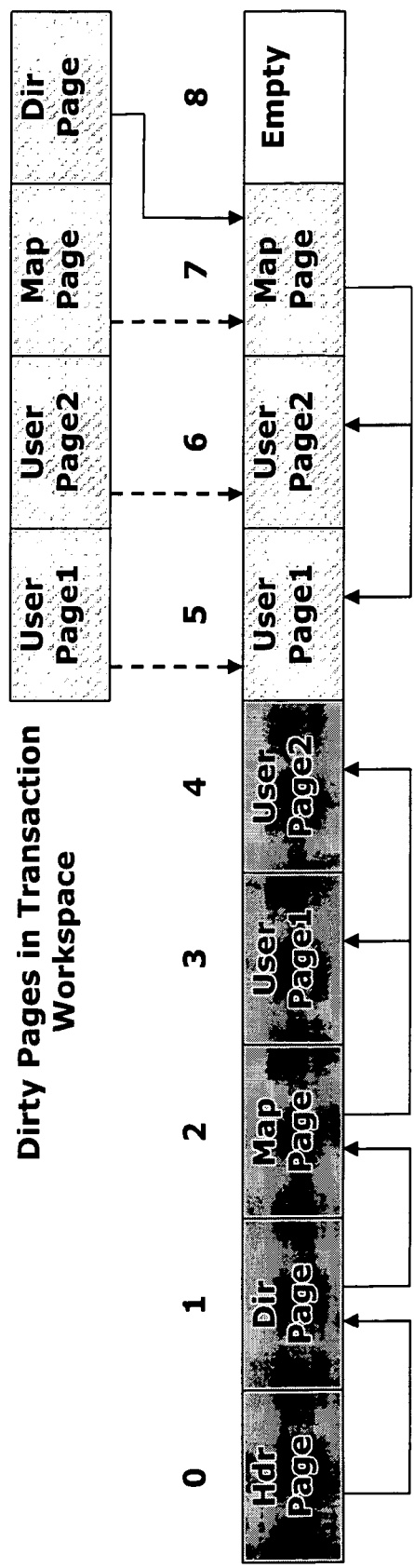

FIG. 10 illustrates the mapping table page being written to unused page 7 and the directory page being updated to reflect the mapping table pages new address. In this example, only one mapping table page is modified. This process is performed similarly to the previously described step. The mapping table page is written to an unused page in the database file and the directory page is updated to reflect the new location of the mapping table page. Other transactions are still using the gray shaded versions of the directory page and mapping table pages, located in pages 1 and 2 respectively.

Figure 11:
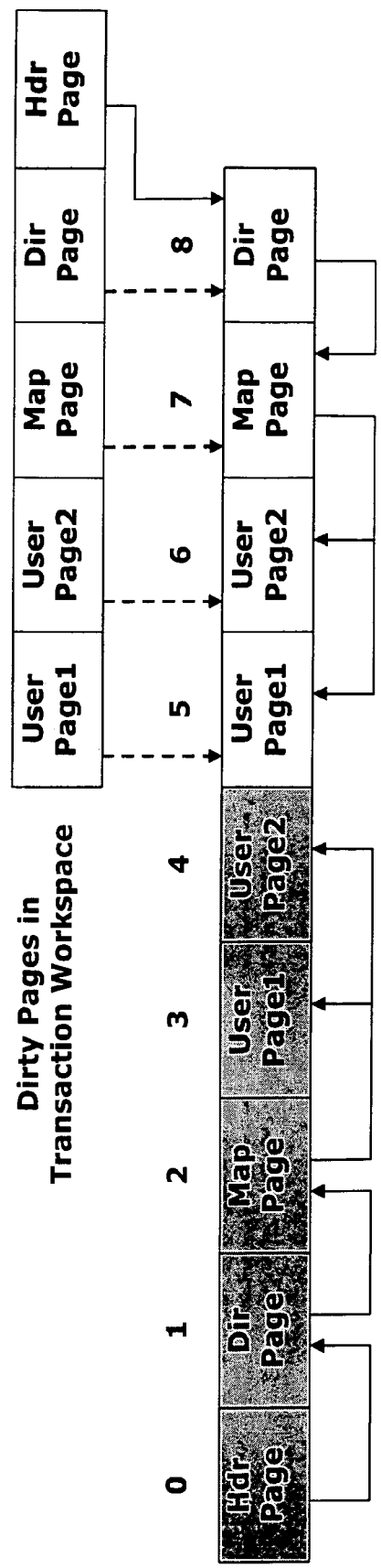
Figure 12:
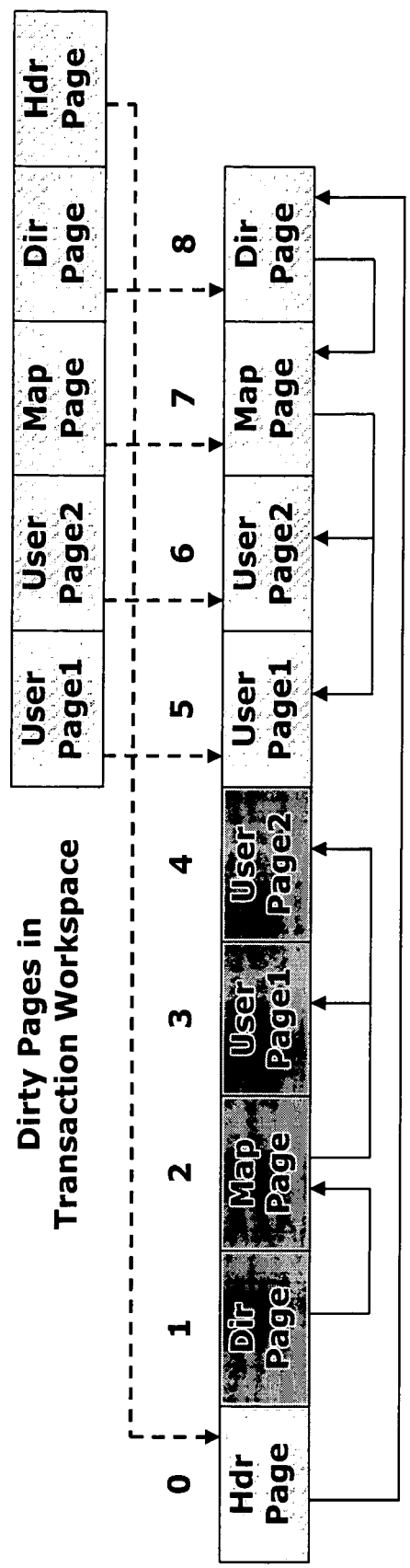
Figure 13:
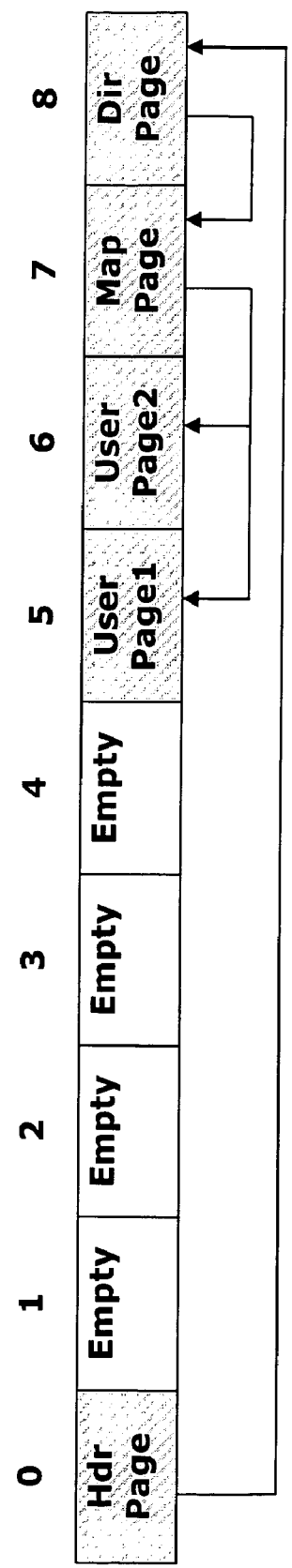

Next the directory page is written to an unused page, (page 8 in this example), as shown in FIG. 11. FIG. 11 also depicts the database header page being updated to reflect the new location of the directory page. Next, as shown in FIG. 12, the database header page is written (using the double flush technique described above). After the header page is written and the double flush processed has been performed, the transaction is successfully committed and its result is now reflected in the state of the database that is exposed to users (i.e., users of the database can now "see" the changes made to the user data pages, the mapping table page and the directory page). As shown in FIG. 13, the physical page addresses that were freed up (pages 1-4) as a result of moving four pages to new physical page addresses are de-allocated (made available).

Figure 14:
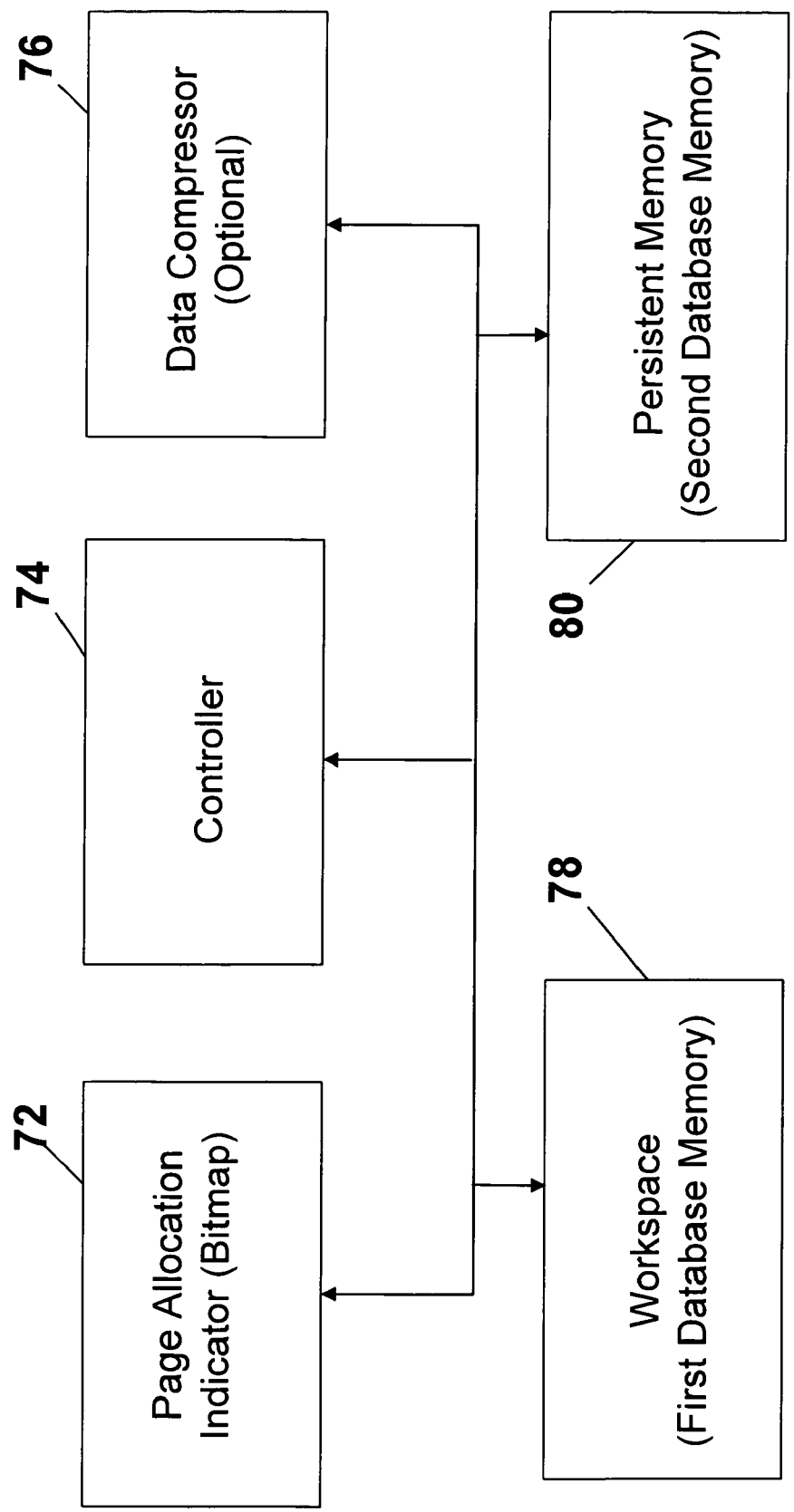
FIG. 14 is a block diagram of a system for performing shadow paging, in accordance with an exemplary embodiment of the present invention.

FIG. 14 is a block diagram of a system for performing shadow paging. In an exemplary embodiment, the system is used to access a database, and is described in such context. The system comprises a workspace (first database memory) 78, a persistent memory (second database memory) 80, a page allocation indicator 72, a controller 74, and an optional data compressor 76. The workspace 78 and the persistent memory 80 may comprise any appropriate type of memory, such as semiconductor memory, magnetic memory (e.g., disk), optical memory, or a combination thereof. Typically and preferably, the persistent memory 80 possesses the capability to persistently store data. Thus, under normal operating conditions, data written to the persistent memory 80 is available until the data is specifically removed and/or rewritten. As described herein, the terms flush and flushing referred to transmitting data to the persistent memory 80.

The page allocation indicator 72 performs the functions of indicating the allocation status of the logical IDs and physical addresses as described above. In an exemplary embodiment, the page allocation indicator 72 comprises a bitmap as described above. The data compressor 76 is optional. The data compressor 76 compresses data in the workspace 78 and/or the persistent memory 80 to reduce the size of memory utilized in the system. The data compressor 76 may incorporate any appropriate data compression technique.

The controller 74 performs many of the functions associated with the maintenance pages (database header page, directory page, and mapping table pages) and also controls the processing of the steps for performing shadow pages as described above. The controller 74 generates maintenances pages for maintaining locations of pages in the database file. The controller also stores contents of selected pages in unused pages (shadow pages). The controller 74 updates the maintenance pages to reflect locations of the shadow pages in the workspace 78. The controller 74 also stores contents of the maintenance pages in unused pages of the workspace 78. The controller 74 stores contents of the workspace 78 in the persistent memory 80. The controller 74 controls the double flushing process described above.

Overview of a Suitable Computing System Environment

Figure 15:
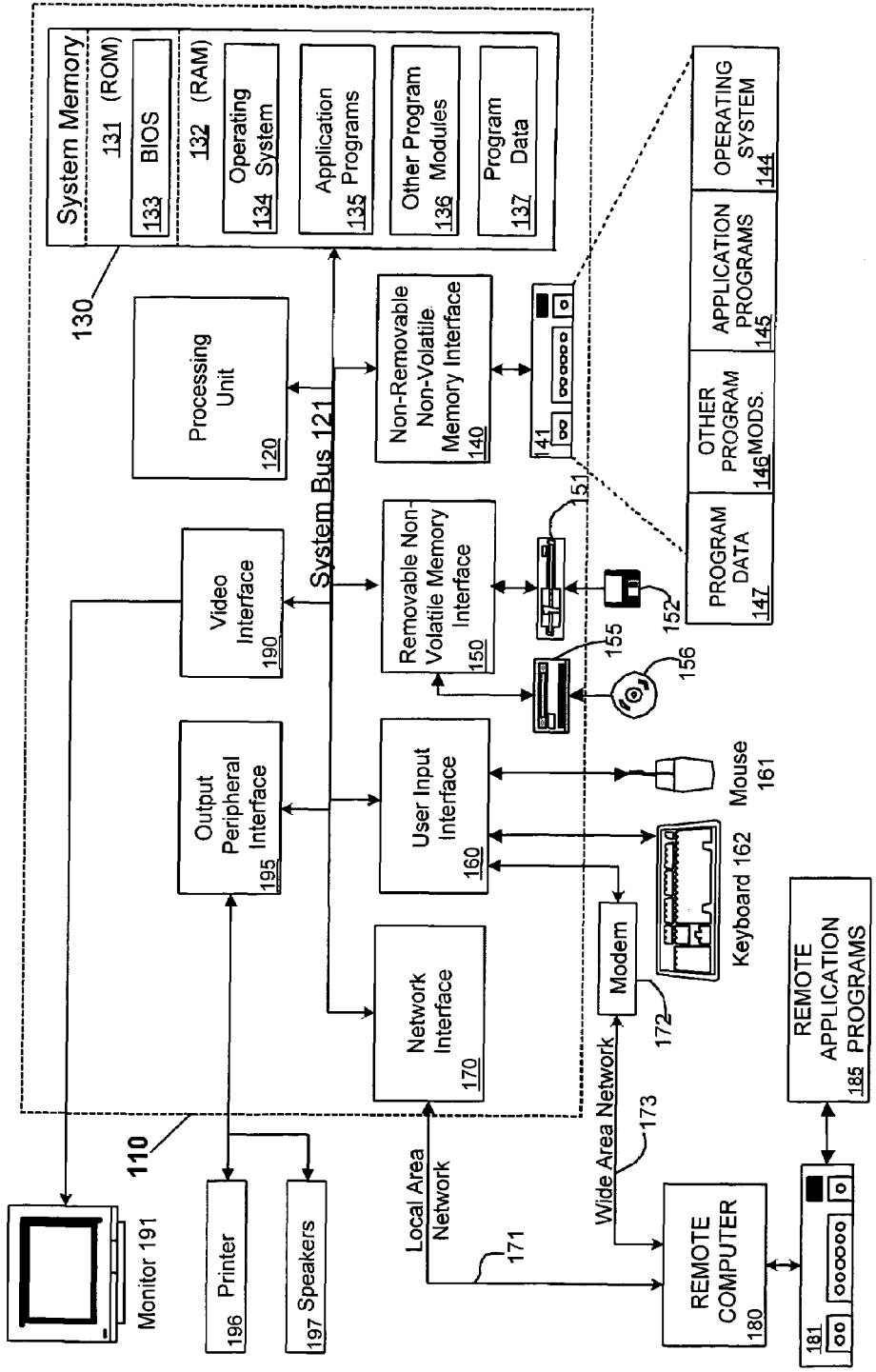
FIG. 15 illustrates an example of a suitable computing system environment in which the method and system for shadow paging in accordance with an exemplary of the present invention may be implemented.

FIG. 15 illustrates an example of a suitable computing system environment 100 in which the method and system for shadow paging may be implemented. The computing system environment 100 is only one example of a suitable computing environment and is not intended to suggest any limitation as to the scope of use or functionality of the method and system for dynamically and individually controlling display elements. Neither should the computing environment 100 be interpreted as having any dependency or requirement relating to any one or combination of components illustrated in the exemplary operating environment 100.

The method and system for shadow paging are operational with numerous other general purpose or special purpose computing system environments or configurations. Examples of well known computing systems, environments, and/or configurations that may be suitable for use with the method and system for dynamically and individually controlling display elements include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The method and system for shadow paging may be described in the general context of computer-executable instructions, such as program modules, being executed by a computer. Generally, program modules include routines, programs, objects, components, data structures, etc. that perform particular tasks or implement particular abstract data types. The method and system for shadow paging may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 15, an exemplary system for implementing the method and system for shadow paging includes a general purpose computing device in the form of a computer 110. Components of the computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. It is to be understood that combinations of any of the media are also included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, are typically stored in ROM 131. RAM 132 typically contains data and/or program modules that are immediately accessible to and/or presently being operated on by processing unit 120. By way of example, and not limitation, FIG. 15 illustrates operating system 134, application programs 135, other program modules 136, and program data 137.

The computer 110 may also include other removable/non-removable, volatile/non-volatile computer storage media. By way of example only, FIG. 15 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM, CDRW, or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 15, provide storage of computer readable instructions, data structures, program modules and other data for the computer 110. In FIG. 15, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 15. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 15 illustrates remote application programs 185 as residing on memory device 181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the .NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the method and system for shadow paging may also be implemented via an operating system, application program interface (API), or a "middle man" object between a coprocessor and requesting object, such that services may be performed by, supported in, or accessed via all of .NET's languages and services, and in other distributed computing frameworks as well.

A method for shadow paging as described herein may be embodied in the form of computer-implemented processes and system for practicing those processes. A method for shadow paging as described herein may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by a computer, the computer becomes a system for practicing the invention. The method for shadow paging as described herein may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes a system for practicing the invention. When implemented on a general-purpose processor, the computer program code segments configure the processor to create specific logic circuits.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While embodiments of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

What is claimed is:

1. A method for accessing a database via a processor, said method comprising:
    storing contents of selected pages of a first database memory of said database in first shadow pages, wherein said first shadow pages comprise unused pages of said first database memory;
    maintaining locations of said selected pages and said first shadow pages in maintenance pages of said database;
    storing contents of said first shadow pages and a first portion of said maintenance pages in a second database memory of said database;
    storing contents of a second portion of said maintenance pages in said second database memory;
    storing said contents of said first shadow pages and said first portion of said maintenance pages in said second database memory a second time;
    indicating said selected pages as used pages;
    responsive to said act of storing said contents of said selected pages in said first shadow pages, indicating said first shadow pages as used pages;
    storing contents of a first portion of said maintenance pages in second shadow pages, wherein said second shadow pages comprise unused pages of said first database memory;
    responsive to said act of storing said contents of said first portion of said maintenance pages in said second shadow pages, indicating said second shadow pages as used pages;
    storing contents of said first shadow pages and said second shadow pages in said second database memory;
    storing said contents of said first shadow pages and said second pages in said second database memory a second time;
    generating a bitmap for indicating whether each page in said first database memory is used or unused; and
    updating said bitmap in accordance with said acts of indicating.

2. A method in accordance with claim 1, wherein said maintenance pages comprise:
    at least one mapping table page for maintaining locations of data pages in said first database memory;
    a directory page for maintaining locations of each mapping table page; and a database header page for maintaining a location of said directory page.

3. A method in accordance with claim 2, wherein:
said act of storing contents of selected pages of said first database memory in said first shadow pages comprises:
storing contents of said data pages in said first shadow pages;
said act of storing contents of said first portion of said maintenance pages in said second shadow pages comprises:
storing contents of said mapping table pages and said directory page in said second shadow pages.

4. A method in accordance with claim 1, further comprising:
subsequent said act of storing said contents of said first shadow pages and said first portion of said maintenance pages in said second database memory a second time:
indicating said second portion of said maintenance pages as unused pages; and
indicating said selected pages as unused pages.

5. A method in accordance with claim 1, further comprising:
compressing contents of said maintenance pages.

6. A computer readable storage medium encoded with a computer program code stored thereon for directing a computer processor to access a database, said program code comprising:
a store selected page code segment for causing said computer processor to store contents of selected pages of a first database memory of said database in first shadow pages, wherein said first shadow pages comprise unused pages of said first database memory;
a maintain location code segment for causing said computer processor to maintain locations of said selected pages and said first shadow pages in maintenance pages of said database;
a store first shadow and first portion code segment for causing said computer processor to store contents of said first shadow pages and a first portion of said maintenance pages in a second database memory of said database;
a store second portion code segment for causing said computer processor to store contents of a second portion of said maintenance pages in said second database memory;
a repeat code segment for causing said computer processor to store said contents of said first shadow pages and said first portion of said maintenance pages in said second database memory a second time;
an indicate selected page code segment for causing said computer processor to indicate said selected pages as used pages;
an indicate first shadow code segment for causing said computer processor to, responsive to said act of storing said contents of said selected pages in said first shadow pages, indicate said first shadow pages as used pages;
a store first portion code segment for causing said computer processor to store contents of a first portion of said maintenance pages in second shadow pages, wherein said second shadow pages comprise unused pages of said first database memory;
an indicate second shadow code segment for causing said computer processor to, responsive to said act of storing said contents of said first portion of said maintenance pages in said second shadow pages, indicate said second shadow pages as used pages;
a store first and second shadow code segment for causing said computer processor to store contents of said first shadow pages and said second shadow pages in said second database memory;
a store again code segment for causing said computer processor to store said contents of said first shadow pages and said second shadow pages in said second database memory a second time;
a generate bitmap code segment for causing said computer processor to generate a bitmap for indicating whether each page in said first database memory is used or unused; and
an update bitmap code segment for causing said computer processor to update said bitmap in accordance with said acts of indicating.

7. A computer readable medium in accordance with claim 6, wherein said maintenance pages comprise:
at least one mapping table page for maintaining locations of data pages in said first database memory;
a directory page for maintaining locations of each mapping table page; and
a database header page for maintaining a location of said directory page.

8. A computer readable medium in accordance with claim 7, wherein:
said act of storing contents of selected pages of said first database memory in said first shadow pages comprises:
storing contents of said data pages in said first shadow pages;
said act of storing contents of said first portion of said maintenance pages in said second shadow pages comprises:
storing contents of said mapping table pages and said directory page in said second shadow pages.

9. A computer readable medium in accordance with claim 6, further comprising:
a final indicate code segment for causing said computer processor to, subsequent said act of storing said contents of said first shadow pages and said first portion of said maintenance pages in said second database memory a second time:
indicate said second portion of said maintenance pages as unused pages; and
indicate said selected pages as unused pages.

10. A computer readable medium in accordance with claim 6, further comprising:
a compress code segment for causing said computer processor to compress contents of said maintenance pages.

11. A system for accessing a database, said system comprising:
a first database memory of said database;
a second database memory of said database;
a controller for:
generating maintenances pages for maintaining locations of pages in said first database memory;
storing contents of selected pages of said first database memory in first shadow pages comprising unused pages of said first database memory;
updating said maintenance pages to reflect locations of said first shadow pages in said first database memory, wherein locations of said selected pages are maintained;
storing contents of a first portion of said maintenance pages in second shadow pages comprising unused pages of said first database memory;

storing contents of said first shadow pages and said second shadow pages in a second database memory of said database;

storing contents of a second portion of said maintenance pages in said second database memory; and repeating said act of storing contents of said first shadow pages and said second shadow pages in a same respective location of said second database memory; and a page allocation indicator for:

indicating that said first shadow pages are used pages in response to said selected pages being stored in said first shadow pages; and indicating that said second shadow pages are used pages in response said contents of said first portion being stored in said second shadow pages, wherein:

said page allocation indicator comprises a bitmap for indicating whether each page in said first database memory is used or unused; and said controller updates said bitmap in accordance with said acts of indicating.

12. A system in accordance with claim 11, wherein:

subsequent to said act of repeating, said page allocation indicator indicates that said second portion of said maintenance pages are unused pages.

13. A system in accordance with claim 11, wherein said controller:

generates at least one mapping table page for maintaining locations of data pages in said first database memory;

generates a directory page for maintaining locations of each mapping table page; and generates a database header page for maintaining a location of said directory page.

14. A system in accordance with claim 13, wherein:

to store said contents of selected pages of said first database memory in said first shadow pages comprises:

said controller stores contents of said data pages in said first shadow pages;

to store said contents of said first portion of said maintenance pages said second shadow pages comprises:

said controller stores contents of said mapping table pages and said directory page in said second shadow pages.

15. A system in accordance with claim 11, further comprising:

a data compressor for compressing contents of said maintenance pages.

16. A method for accessing a database, said method comprising:

storing contents of selected data pages of said database in first shadow pages, wherein said first shadow pages comprise unused pages of said database;

maintaining locations of said selected data pages and said first shadow pages in mapping table pages of said database;

maintaining locations of each mapping table page in a directory page of said database;

maintaining a location of said directory page in a database header page of said database;

storing contents of said first shadow pages, said mapping table pages, and said directory page, in a persistent database memory of said database;

storing contents of a second portion of said maintenance pages in said persistent database memory; and storing said contents of said first shadow pages and said first portion of said maintenance pages in said persistent database memory a second time.

* * * * *